United States Patent [19]

Nishiyama et al.

[11] Patent Number: 5,109,858
[45] Date of Patent: May 5, 1992

[54] PULSE DOPPLER MEASURING APPARATUS

[75] Inventors: Hisashi Nishiyama, Tokyo; Yasuhiro Hashimoto, Yokohama; Hiroshi Kanda, Tokorozawa; Kageyoshi Katakura, Tokyo, all of Japan

[73] Assignee: Hitachi, Ltd., Tokyo, Japan

[21] Appl. No.: 650,421

[22] Filed: Feb. 4, 1991

[30] Foreign Application Priority Data

Feb. 5, 1990 [JP] Japan .................................. 2-24550

[51] Int. Cl.$^5$ .............................................. A61B 8/00
[52] U.S. Cl. .............................. 128/661.09; 73/861.25
[58] Field of Search ...................... 128/661.08, 661.09; 73/861.25

[56] References Cited

U.S. PATENT DOCUMENTS

| | | | |
|---|---|---|---|
| 3,953,823 | 4/1976 | Katakura | 128/661.09 |
| 4,671,294 | 6/1987 | Magnin et al. | 128/661.09 |
| 4,719,923 | 1/1988 | Hartwell et al. | 128/661.08 |
| 4,751,847 | 6/1988 | Katakura et al. | 73/861.25 |
| 4,884,448 | 12/1989 | Ogawa et al. | 73/597 |
| 4,911,171 | 3/1990 | Uchibori | 128/661.09 |
| 4,955,386 | 9/1990 | Nishiyama et al. | 128/661.09 |

OTHER PUBLICATIONS

Blood Flow Imaging Using a Discrete-Time Frequency Meter, Center for Bioengineering FT-15, University of Washington, Seattle, Wash. 98195, pp. 348-352, 1978.

Primary Examiner—Francis Jaworski
Assistant Examiner—George Manuel
Attorney, Agent, or Firm—Antonelli, Terry, Stout & Kraus

[57] ABSTRACT

The present invention relates to a pulse Doppler measuring apparatus using the so-called acceleration method. In order to prevent production of a secondary aliasing (where a phase vector is subjected to an aliasing), the apparatus is provided with an MTI filter, which decomposes a first phase vector of a reflected wave obtained by mixing a reflection signal with a reference signal into a real part and an imaginary part, obtains a first regression line for variations of each of the parts and extracts a second phase vector corresponding only to the high frequency component of the reflected wave by calculating differences of the real part and the imaginary part from the first regression line; and/or an angular component $\Delta\theta$ of the phase difference vector is obtained; a second regression line is obtained for this phase difference angle $\Delta\theta$; and the phase difference angle $\Delta\theta$ is corrected by using this second regression line, to prevent the production of a secondary aliasing.

33 Claims, 12 Drawing Sheets

F I G. 1A
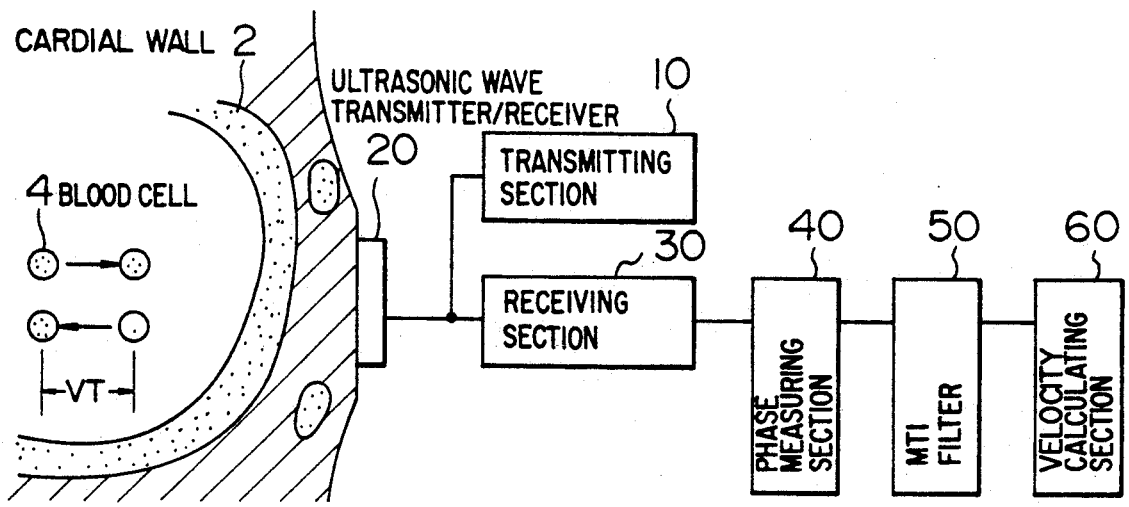
F I G. 1B
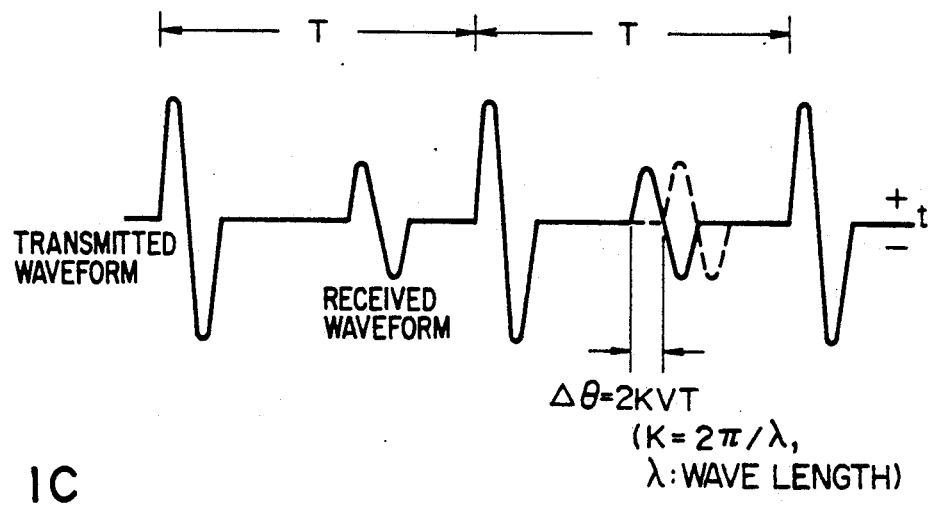
$\Delta\theta = 2KVT$
$(K = 2\pi/\lambda,$
$\lambda$: WAVE LENGTH)
F I G. 1C
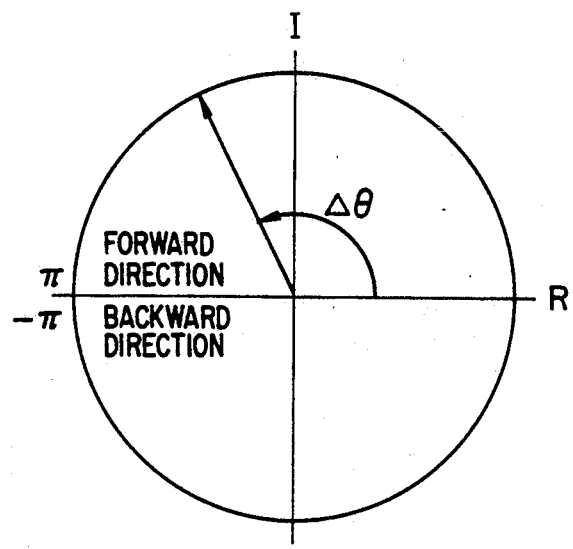

T: TRANSMITTED PULSE INTERVAL

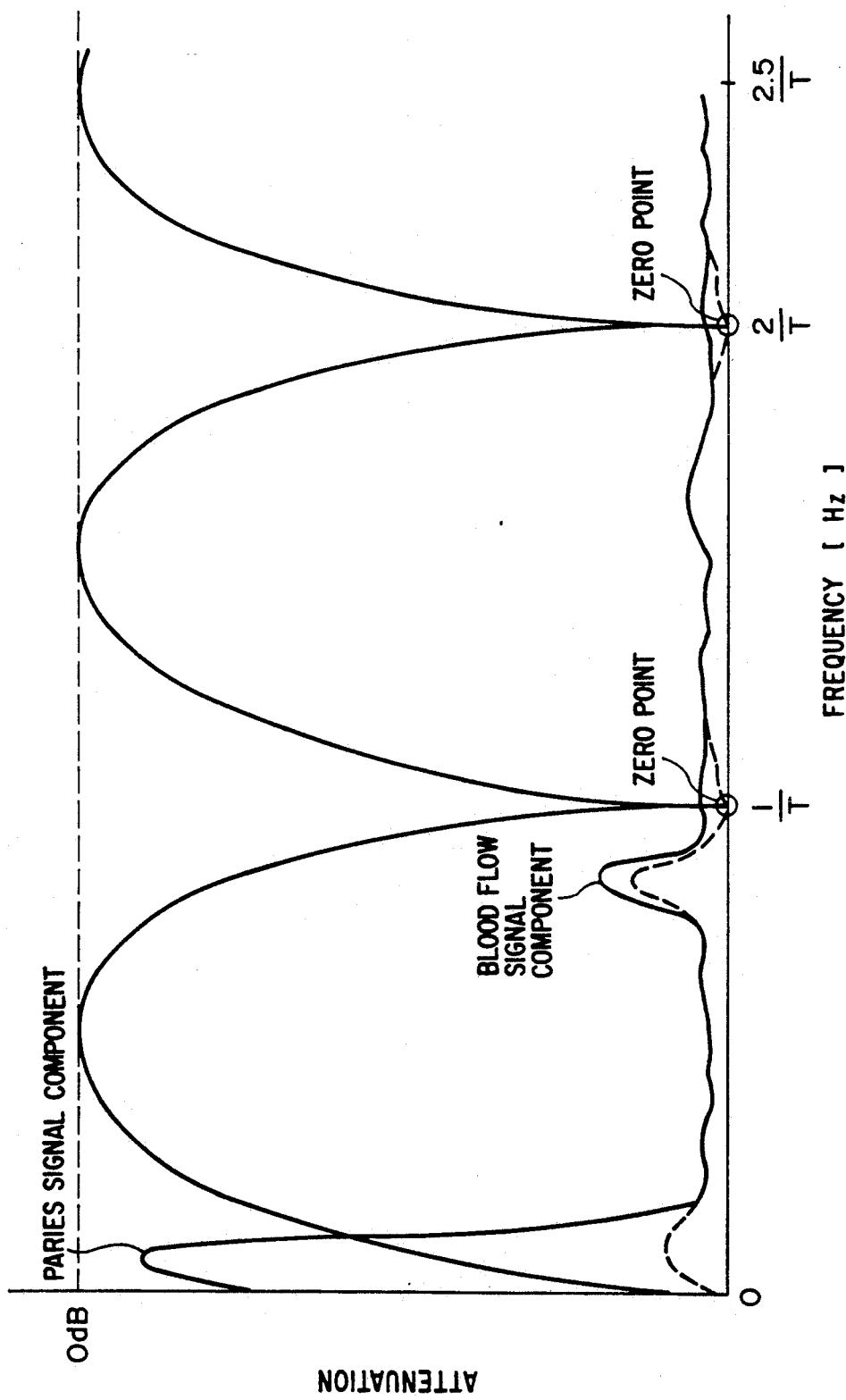

FIG. 9
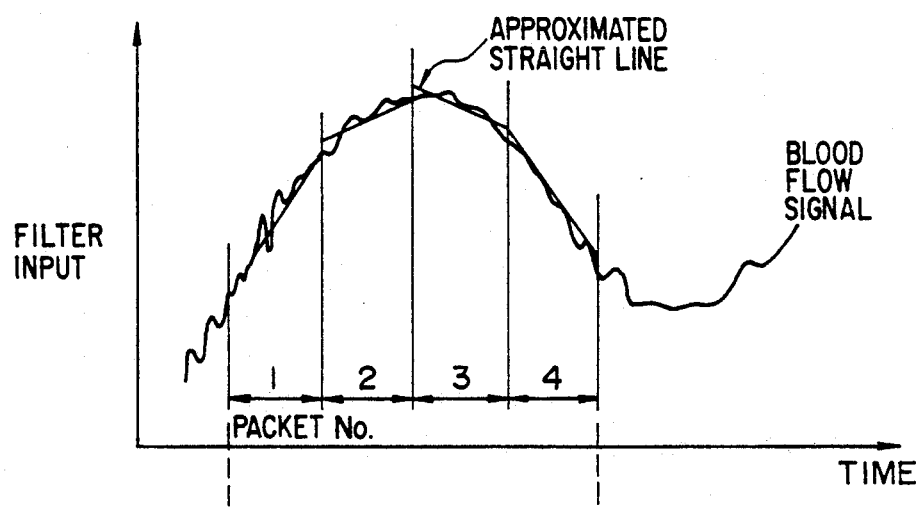
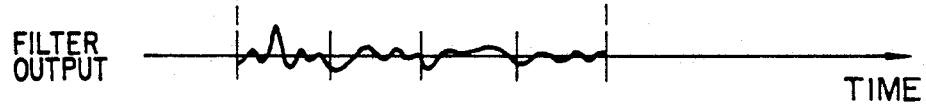
FIG. 10
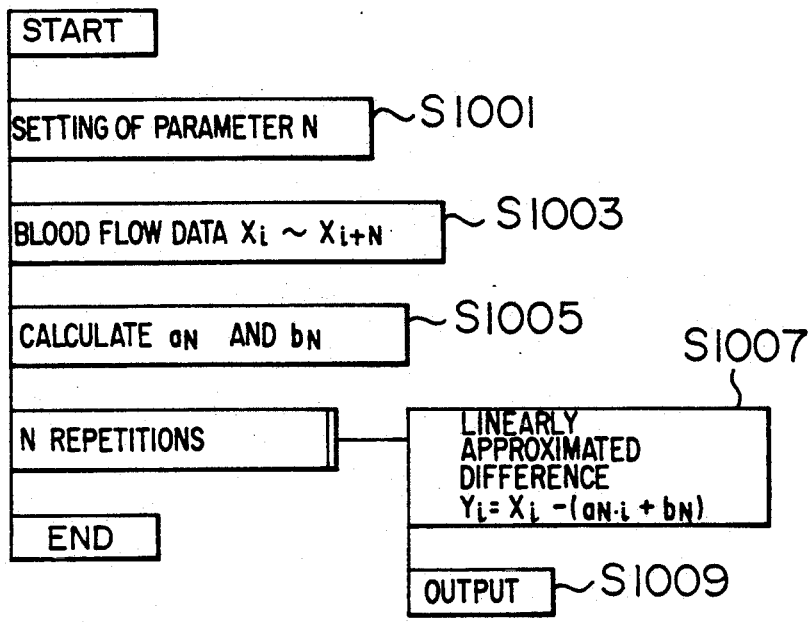

PULSE DOPPLER MEASURING APPARATUS

BACKGROUND OF THE INVENTION

The present invention realtes to a pulse Doppler measuring apparatus and more in detail to an apparatus for measuring the speed of a body, in particular the blood flow speed in a living body, by using ultrasonic pulses.

When ultrasonic wave is sent to a living body, the frequency of reflected wave is shifted by the Doppler effect due to movement of red blood cells. For example, in FIG. 1A, when ultrasonic pulses are sent to blood cells 4 in a heart 2 with a constant interval T by driving a ultrasonic transmitter/receiver 20 by means of a wave transmitting section 10, in the case where the blood cells 4 move towards the ultrasonic transmitter/receiver 20, a phase difference is produced in the reflected wave coming from the blood cells, which is received by the ultrasonic transmitter/receiver 20 and detected by a receiving section 30. At this time, denoting the blood flow velocity by v, the displacement of the blood cells in this period of time T is given by vT. The phase difference $\Delta\theta$ between the preceding reflected wave and the reflected wave at this time is given by:

$$\Delta\theta = 2\pi f_d T \qquad (1)$$
$$= 2kvT$$

where $k = 2\pi/\lambda$ $\lambda$: wavelength of transmitted ultrasonic wave $f_d$: Doppler frequency of moving object as indicated in FIG. 1B. Using the relation expressed by Eq. (1), it can be known that the phase difference $\Delta\theta$ is proportional to vT.

Consequently it is possible to obtain a phase vector of the reflected wave by mixing the reflected wave with a reference wave in a phase measuring section 40, to calculate $\Delta\theta$ and obtain further the blood flow velocity v in a velocity calculating section 60 from the phase vector, which has passed through an MTI filter 50. However, as indicated in FIG. 1C, there is a restriction given by, $$|\Delta\theta| < \pi \qquad (2)$$

on the phase difference $\Delta\theta$, which can be measured (because the principal value of the inverse tangent trigonometrical function is taken). Refer to 1978 Ultrasonic Symposium Proceedings IEEE Cat. pp. 348-352.

In an ultrasonic diagnostic apparatus used at present a pulse Doppler blood flow meter is incorporated. This is an apparatus, by which pulsed ultrasonic wave is sent to a body and the blood flow velocity is obtained by using the frequency shift produced by the Doppler effect. The pulse Doppler method has a merit that it is possible to measure the blood flow in a specified part in a body with respect to the continuous wave Doppler method. However, on the other hand, it has a problem that it is not possible to measure any high velocity blood flow exceeding the Nyquist frequency, restricted by the pulse repetition frequency.

Taking diagnosis of heart disease as an example, the measurable limit velocity therefor is about 1 m/sec. On the other hand, in the case where there is abnormal blood flow, the highest velocity thereof is about 5 m/sec. Consequently it is strongly desired by medical doctors to develop a blood flow meter, in which no aliasing takes place.

In the case where the blood flow velocity is large, values different from true values for the velocity and the direction of the blood flow are outputted. This takes place, when a true phase difference $\Delta'\theta$ corresponding to the true velocity exceeds $\pm\pi$. The relation between the true phase difference $\Delta'\theta$ and detected phase difference $\Delta\theta$ is given by;

$$\Delta'\theta = \Delta\theta + 2\pi \text{ for } 2\pi > \Delta'\theta \geqq \pi$$
$$= \Delta\theta - 2\pi \text{ for } -2\pi < \Delta'\theta < -\pi$$

Denoting the pulse repetition frequency by $f_s$, using Eq (1), the limit of the measurable blood flow is given by:

$$|\Delta\theta| < \pi \rightleftharpoons |2\pi f_d T| < \pi \rightleftharpoons |f_d| < 1/2T \rightleftharpoons |f_d| < f_s/2 \qquad (3)$$

where $f_s = 1/T$

T: interval of transmitted pulses $f_d$: Doppler frequency of moving object

Accordingly, the limit of the blood flow velocity measurable by the pulse Doppler method is determined by the pulse repetition frequency $f_s$. Here, according to the condition expressed by Eq. (3), if the pulse repetition frequency $f_s$ is increased, i.e. if the pulse interval T is decreased, it is possible to enlarge the measurable domain of the blood flow velocity.

However, if the pulse interval T is decreased, since the measurable depth is decreased, depending thereon, it is difficult to measure the high velocity blood flow in a deep part. Between the measurable highest blood flow velocity $F_m$ and the depth $L_m$ the following relationship is valid;

$$L_M \cdot F_M \leqq C/4$$

where C represents the sound velocity in body.

That is, as far as the aliasing as described previously is produced, it was an important problem how to overcome this problem that there is the relation between the measurable highest blood flow velocity and the depth.

Therefore, in order to produce no aliasing, a method, by which variations are given to the pulse interval (refer to U.S. Pat. No. 4,751,847) and a so-called acceleration method (refer to U.S. Pat. No. 4,884,448) have been proposed. The present invention is an invention, which develops further the latter.

The acceleration method is an algorithm contrived in order to measure precisely a high velocity blood flow (without aliasing), which algorithm is illustrated in FIGS. 2A, 2B and 2C. Hereinbelow the principle thereof will be explained.

According to this method, a vector $U_n$ representing a difference between phase differences is obtained at first by effecting a correlation processing of a phase difference vector $Y_n$ and the complex conjugate vector $Y_{n-1}^*$ of a directly preceding phase difference vector $Y_{n-1}$ obtained by the prior art method. Next, $\Delta\Delta\theta_n$ is obtained starting from that vector $U_n$. That is, $$U_n = Y_n Y_{n-1}^* \text{ (}()^* \text{ is a complex conjugate vector of } Y) \quad (4)$$
$$= C_n \exp(j\Delta\theta_n) C_{n-1} \exp(-j\Delta\theta_{n-1})$$
$$= C_n C_{n-1} \exp\{j(\Delta\theta_n - \Delta\theta_{n-1})\}$$
$$= D_n \exp(j\Delta\Delta\theta_n)$$
$$= U_{Rn} + jU_{In}$$

where $D_n = C_n C_{n-1}$ $\Delta\Delta\theta_n$: principal value of plase difference
$(\Delta\theta_n - \Delta\theta_{n-1})$
$U_{Rn}$: real part of $U$
$U_{In}$: imaginary part of $U$ Therefore, using $U_{Rn}$ and $U_{In}$ in Eq. (4), $$\Delta\Delta\theta_n = \tan^{-1}(U_{In}/U_{Rn}) \quad (5)$$

is obtained.

Further, apart from the method described above, there are various sorts of method for calculating $\Delta\Delta\theta$. For example, $$\Delta\Delta\theta_n = \Delta\theta_{n+1} - \Delta\theta_n + A$$

where $$A = +2\pi \text{ for } \Delta\theta_{n+1} - \Delta\theta_n < -\pi$$

and $$A = -2\pi \text{ for } \Delta\theta_{n+1} - \Delta\theta_n > \pi$$

Here, since the principal value of the inverse tangent trigonometrical function is taken for the difference between phase differences, $$|\Delta\Delta\theta_n| < \pi$$

is valid.

According to the principle of the acceleration method, as indicated in FIG. 2A, the directly succeeding phase difference $\Delta\theta'_{n+1}$ is obtained by adding the principal value $\Delta\Delta\theta_n$ of the difference between two phase differences to the current phase difference $\Delta\theta_n$. That is, $$\Delta\theta'_{n+1} = \Delta\Delta\theta_n + \Delta\theta_n \quad (6)$$

is valid. For this reason, even in the case where the limit given by Eq. (3) is exceeded and the aliasing phenomenon takes place, no aliasing appears, as indicated in FIG. 2C, and thus the blood flow velocity can be measured over the present limitation. Further, since the transmitted pulse interval T remains as it is, the depth of the measurement is also held as it is.

However, in the blood flow measurement by this method, in the case where a true value $\Delta\Delta'\theta$ of the difference between two phase differences, which is corresponds to a true value of acceleration of blood flow, increases so that $|\Delta\Delta'\theta| > \pi$, this gives rise to another problem that an erroneous measurement takes place. The relation between the true value $\Delta\Delta'\theta$ and a detected value $\Delta\Delta\theta$ is given by;

$$\Delta\Delta'\theta = \Delta\Delta\theta + 2\pi \text{ for } 2\pi > \Delta\Delta'\theta \geq \pi \quad (7)$$

-continued
$$= \Delta\Delta\theta - 2\pi \text{ for } -2\pi < \Delta\Delta'\theta < -\pi \quad (8)$$

and thus an error of $\pm 2\pi$ is produced. Here, this phenomenon being called a second aliasing, the phase difference outputted after the occurrence of the second aliasing continues to have e.g. an error of $2\pi$ in Eq. (6) and it is difficult to correct it to return to a correct value.

According to a study of the inventors of the present invention, although (A) production of noise due to characteristics of an MTI filter, (B) noise at the measurement (unexpected movement of the transmitter/ receiver, etc.), (c) rapid variations in the blood flow and (d) low S/N ratio were cited as causes of the production of the second aliasing described above, it has been clearly recognized that (A) the characteristics of the filter are the most important cause of the production.

Here the MTI (Moving Target Indicator) filter is a kind of high-pass filters, which cuts the low frequency component included in the signal reflected by a living body, in the case where the blood flow in a heart or a blood vessel is measured. The low frequency component stated above is produced by the wall motion. Specifically, in the case of the heart, the signal level due to movements of the cardinal wall is extremely high with respect to the blood flow signal level and the difference from the signal level on blood flow information to be obtained is as great as 20 to 60 dB (refer to FIGS. 7 and 9). That is, the MTI filter is used for removing this unnecessary information component.

FIG. 3 shows characteristics of an MTI filter generally used for realizing the acceleration method. In the neighborhood of DC of this MTI filter the signal component due to the wall motion is eliminated. However, since the amplitude of the blood flow signal component is reduced at the neighborhood of zero points of $$\frac{1}{T} \text{ and } \frac{2}{T}.$$

it is can't be helped that the S/N ratio is lowered there. This is true also at $$-\frac{1}{T} \text{ and } -\frac{2}{T}.$$

It is because when $$\frac{2.5}{T}$$

is converted into phase, it is $5\pi$ and a case where the phase difference $\Delta\theta$ is obtained upto a value 5 times as great as usual one is presumed that data are indicated in the figure up to $$\frac{2.5}{T}.$$

When the S/N ratio is lowered in the neighborhood of such zero points, the signal is apt to include errors, and even in the case where there are no important variations in the blood flow velocity, it can happen that $|\Delta\Delta'\theta|$ is greater than $\pi$ and that the secondary aliasing is produced.

SUMMARY OF THE INVENTION

A first object of the present invention is to provide a pulse Doppler measuring apparatus or color flow mapping (CFM) apparatus provided with an MTI filter capable of reducing the production of the secondary aliasing as far as possible by raising the S/N ratio in the neighborhood of the zero points.

A second object of the present invention is to provide a pulse Doppler measuring apparatus or color flow mapping apparatus, by which a correct value can be obtained and in this way it is possible to measure the true velocity of a moving body, even if the secondary aliasing is produced, i.e. $|\Delta\Delta'\theta_n| > \pi$ is valid, in the case where the velocity of the body is measured by the acceleration method.

In order to achieve the first object described above, the present invention provides a pulse Doppler measuring apparatus comprising an MTI filter, which is so constructed that a phase vector obtained by mixing a signal reflected by a living body with a reference signal and passing through a low-pass filter is decomposed into a real part and an imaginary part and a phase vector corresponding only to the high frequency component of the reflected signal is extracted by obtaining a first regression line of variations of the different parts and obtaining differences between the first regression line and values of the different parts. Here the first regression line approximates the low frequency component of the reflected signal.

The MTI filter thus constructed obtains the first regression line, using all the values of the real part and the imaginary part of the phase vector and can cut the low frequency component on the basis thereof. Consequently the S/N ratio is improved with respect to that obtained by using a usual n-th order high-pass filter (which can utilize only (l−n) data sets among l data sets).

Further, in order to achieve the second object described above, according to the present invention, an angular component $\Delta\theta$ of the phase difference vector; a second regression line is obtained for thus angle $\Delta\theta$ of the phase difference; and the angle $\Delta\theta$ of the phase difference is corrected by using this regression line in order to prevent the production of the secondary aliasing.

BRIEF DESCRIPTION OF THE DRAWINGS

FIG. 1A is a scheme showing the construction of a general apparatus for measuring the blood flow velocity;

FIG. 1B shows waveform of a reflected wave;

FIG. 1C is a scheme representing the phase vector of the reflected wave;

FIG. 3 is a scheme indicating characteristics of an MTI filter;

FIG. 9 shows the principle of a trend removing filter;

FIG. 10 is a PAD scheme of the trend removing filter;

DESCRIPTION OF THE PREFERRED EMBODIMENTS

Figure 2A:
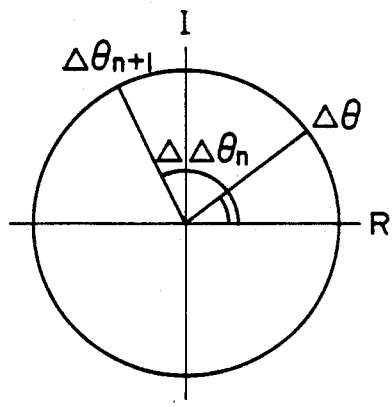
FIGS. 2A, 2B and 2C indicate the principle of the acceleration method.
Figure 2B:
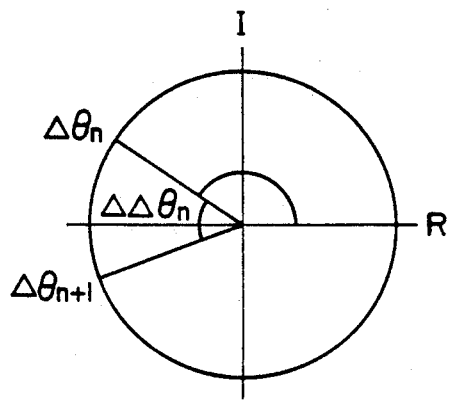
Figure 2C:
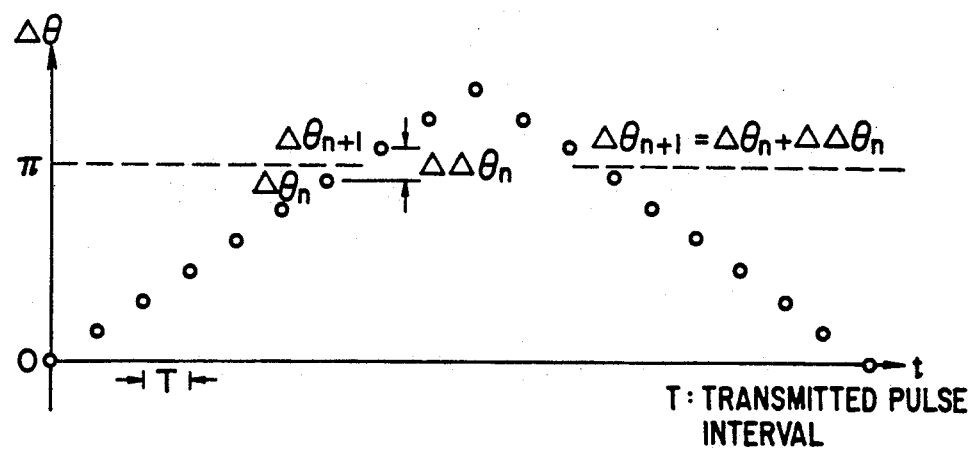
Figure 4:
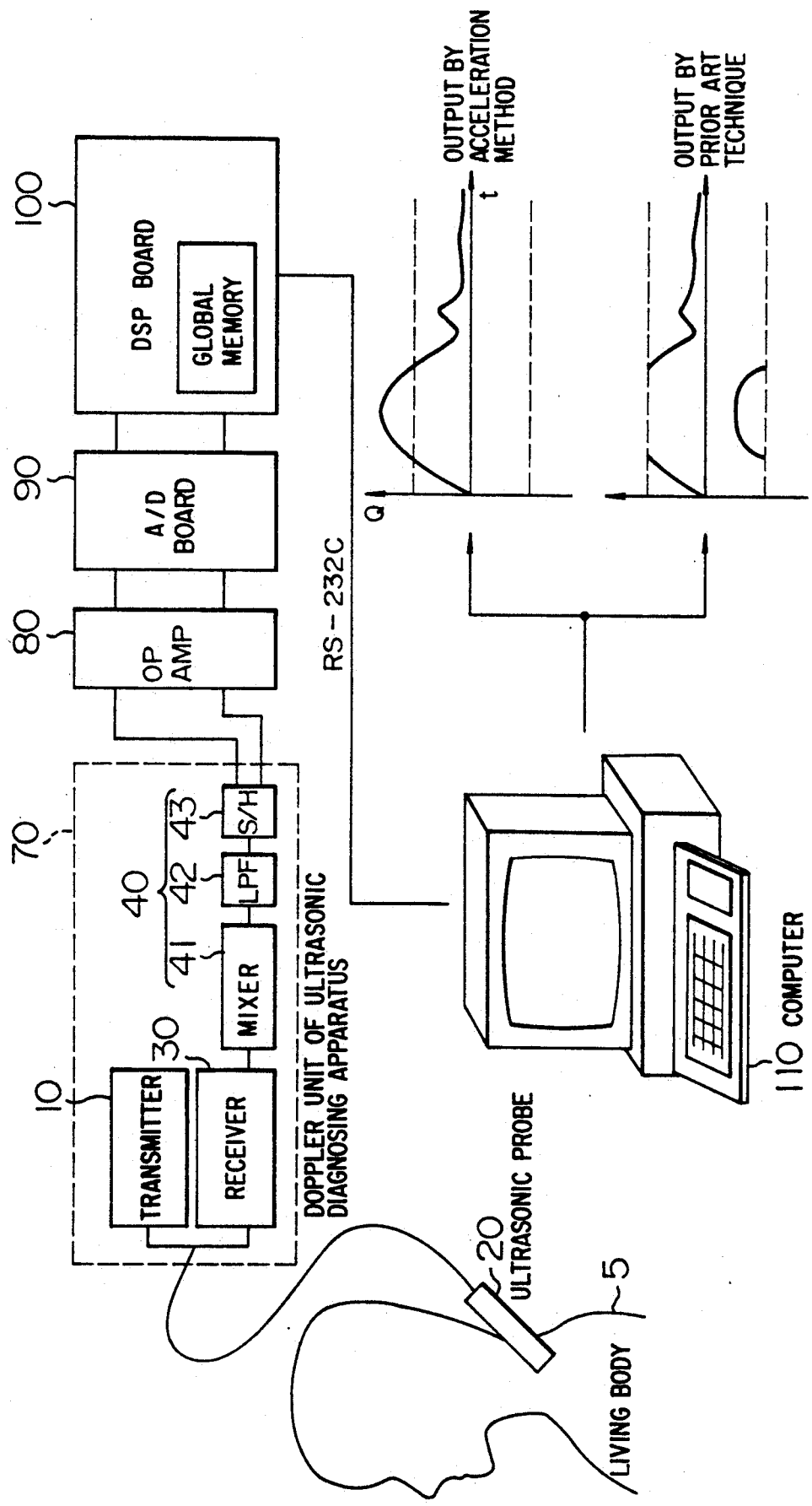
FIG. 4 is a scheme showing the construction of a measuring apparatus, which is an embodiment of the present invention.

FIG. 4 indicates the construction of an embodiment of the present invention. A Doppler unit 70 of a ultrasonic diagnostic apparatus has a same construction as that composed of 10, 30 and 40 in FIG. 1A. However the phase detecting section 40 will be described in detail. It has a mixer 41 effecting mixing 2 reference waves having a 90° phase difference and a received signal; a low pass filter 42 making the low frequency component of the signal obtained by the mixing pass through; and a sample hold circuit 43. The phase of reflected signals obtained one after another by means thereof is detected and a phase vector consisting of a real part and an imaginary part is obtained. This Phase vector is given to an A/D board through an operational amplifier 80 and transformed into a digital signal there, which is given to a signal processing section consisting of a DSP board 100 and a computer 110. This processing section plays the role of the MTI filter and calculates the phase difference $\Delta\theta$, the difference $\Delta\Delta\theta$ between the phase differences and the blood flow velocity from the phase difference $\Delta\theta$.

Concerning the means and the procedure for obtaining the phase difference $\Delta\theta$; the means and the procedure for obtaining the difference of two phase differences $\Delta\Delta\theta_n$ (principal value of an angle $(\Delta\theta_{n+1} - \Delta\theta_n)$); and the means and the procedure for calculating the blood flow velocity, starting from $\Delta\theta_n$, refer to U.S. Pat. No. 4,884,448.

Next, the MTI filter for CFM will be explained. The inventors of the present invention have repeated studies on the MTI filter at completing the present invention.

Figure 5:
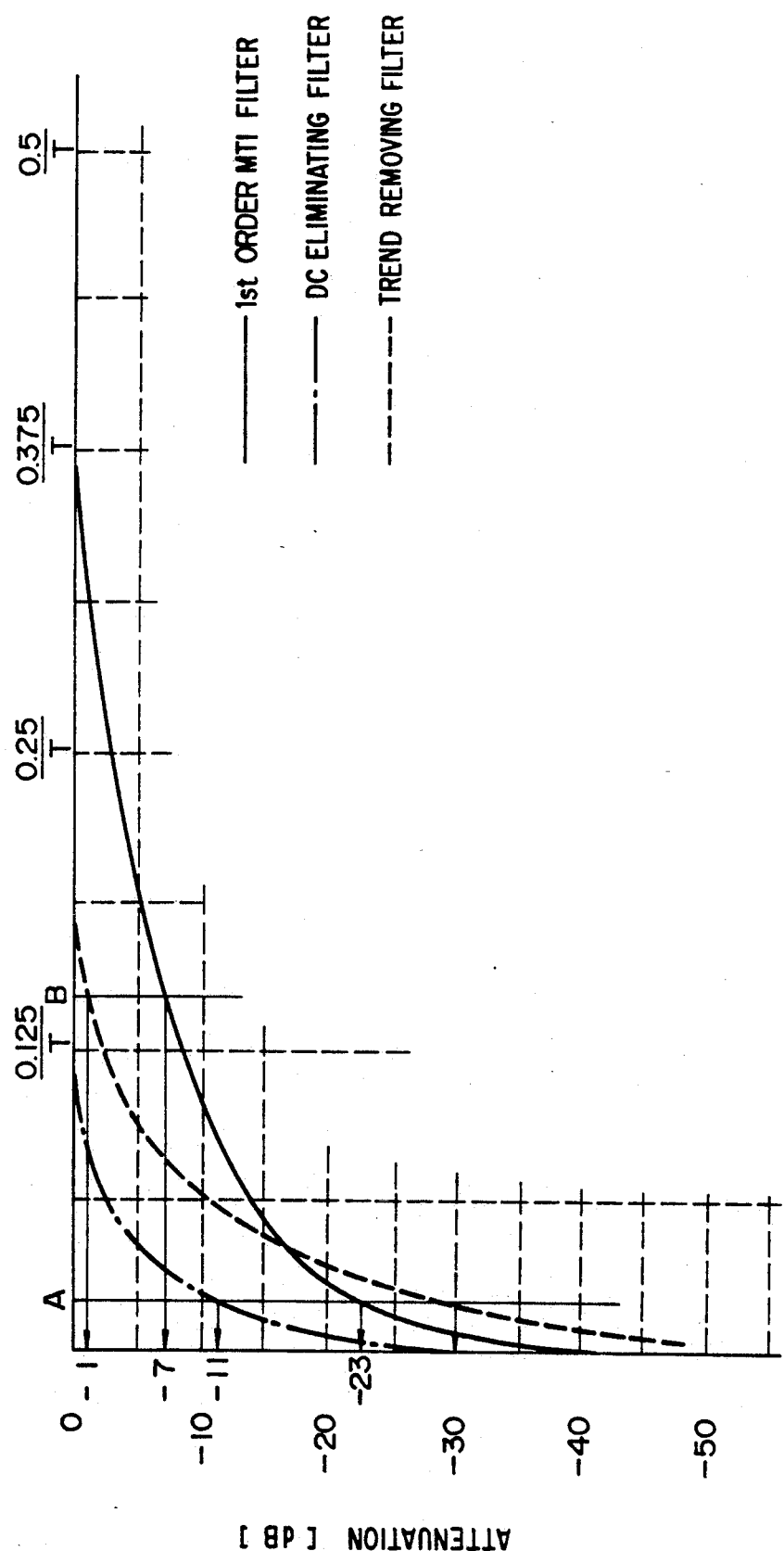
FIG. 5 is a scheme for comparing characteristics of various sorts of MTI filters.

FIG. 5 is a graph indicating attenuation characteristics of various sorts of filters for the real part of the phase vector.

Figure 6:
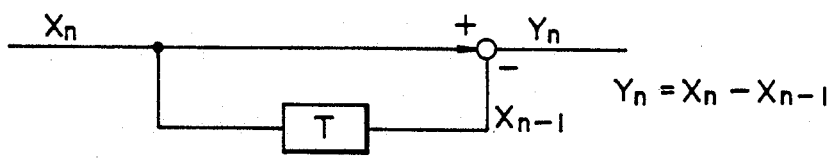
FIG. 6 shows the principle of a primary filter.

(1) The filter having characteristics represented by a full line in the graph is a so-called 1st-order filter outputting the difference value $Y_n = x_n - x_{n-1}$ between the present signal $x_n$ and the preceding signal $x_{n-1}$, as indicated in FIG. 6.

Figure 7:
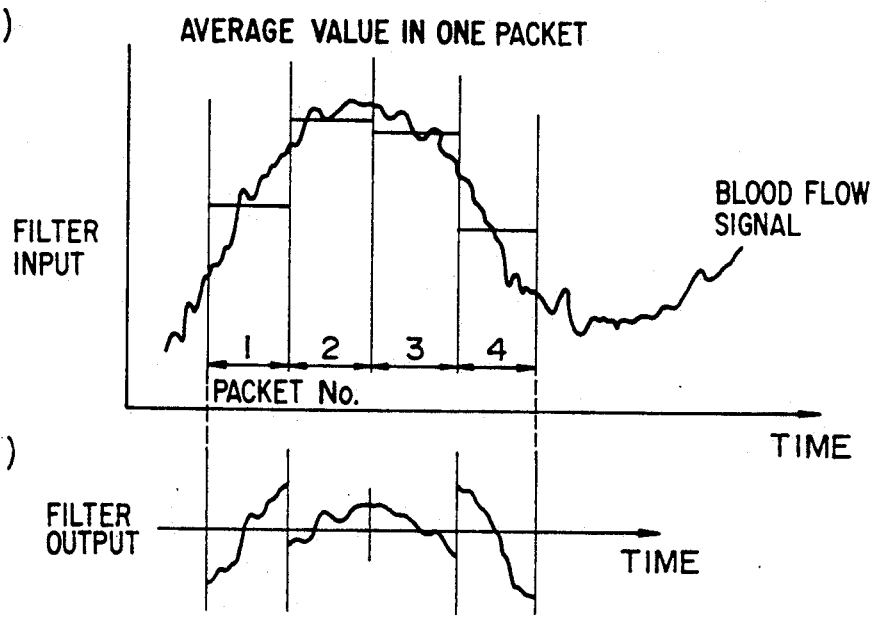
FIG. 7 shows the principle of a DC eliminating filter.

(2) The filter having characteristics represented by a chain-dotted line in the graph is a DC removing filter. As indicated in FIG. 7(a), this filter makes one packet for every N data sets; obtains the average value $\overline{X}_n$ of the blood flow data for every packet; and subtracts the average value from each of the data sets $X_i$ to $X_{i+N}$ to eliminate the DC component, as indicated in FIG. 7(b). Where, "packet" means data length to get the velocity per pixel in CFM. It is used, when only the DC component exists in the obtained blood flow data, and suitable for a pseudo blood flow signal obtained by using a phantom.

FIG. 7(a) indicates the relation between the real part of the amplitude of the phase vector inputted in the filter and the time.

Figure 8:
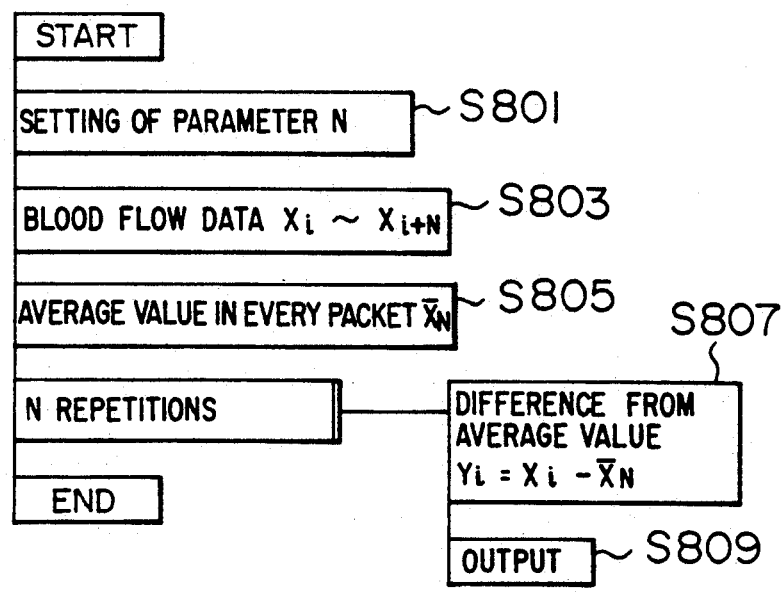
FIG. 8 is a PAD scheme of the DC eliminating filter.

FIG. 8 shows a PAD scheme for executing this filter. In Step 801, a number N of data sets constituting one packet is set. In Step 803, N blood flow data sets (real part of the amplitude) is read-in and the arithmetic average value $\overline{X}_N$ is calculated (Step 805). In Step 807, the average value $\overline{X}_N$ is subtracted from each amplitude value $X_i$ and in Step 809, the value thus obtained is outputted, as indicated in FIG. 7(b).

(3) The filter having characteristics represented by a broken line in the graph is a trend removing filter. This filter is one obtained by extending the DC removing filter and used, when a low frequency wall motion signal component exists apart from the DC component. This filter effects a linear approximation, using the least square method, for the blood flow data in each packet and eliminates the low frequency component by subtracting the value. (a) and (b) in FIG. 9 show the input and the output of the filter, respectively. This filter processing will be concretely described, referring to FIG. 10. At first, a number N of data sets constituting a packet for dealing with blood flow data (phase vectors) given successively for every packet is set (Step 1001). When N phase vectors $X_i$ to $X_{i+N}$ in one packet have become complete (Step 1003), signal variations in the relevant packet are linearly approximated and the gradient $a_N$ and the intercept $b_N$ there of are obtained (Step 1005). Concretely speaking, a straight line approximating variations in the real part by the least square method is obtained, starting from the real part of each of the phase vectors. Then the corresponding value of the first straight line is subtracted from the real part of each of the phase vectors to obtain the difference (Step 1007) and the value is outputted, as indicated in FIG. 9(b) (Step 1009).

FIGS. 7(a) and 9(a) show variations in time of the real part of the amplitude of each of the phase vectors inputted in the DC eliminating filter and the trend removing filter, respectively. Since the imaginary part is retarded by 90° with respect to the real part, the waveform thereof is shifted by a time of T/4 to the left in each of the figures. The value of this imaginary part is also subjected to the same processing as described above to remove the component due to movement of the cardinal paries. The phase vector corresponding only to the blood flow signal is formed by combining the real part with the imaginary part outputted from the filter.

As explained above, since the DC removing filter and the trend removing filter utilize all the data inputted in them, the regression line (straight line indicating $\overline{X}_N$, straight line obtained by the least square method) obtained from each of the data sets approximates the low frequency component more precisely. In order to approximate the low frequency component still more precisely, it is possible to use a sinusoidal curve, a geometrical average, a parabolic curve, etc. When a linear prediction method by low order linear model is used, it's also possible to fit and remove the wall motion signal. When the order is 2, the residual signal of linear model expresses the blood flow signal. When the order is 4, one complex coefficients means the wall motion signal and another complex coefficients means the signal from the blood flow.

Returning to FIG. 5, the characteristics of the 3 sorts of filters described above are compared. A case where the signal from the paries is found in the neighborhood of a point A and where blood flow signals are found in the neighborhood of a point B is supposed. At the point A, the attenuation by the trend removing is −30 dB, which is the greatest. It is −23 dB by the 1st-order MTI filter, which is the next greatest and −11 dB by the DC removing filter. Next, for the blood flow signal at the point B, the attenuation is −7 dB by the 1st-order MTI filter, −1 dB by the trend removing filter, and 0 dB by the DC removing, filter.

The 1st order MTI filter has a drawback that the blood flow signal is attenuated also together with the wall motion signal. By the DC removing filter movement of the wall remains and the blood flow signal is also left. The trend removing filter eliminates well the wall motion signal and leaves well the blood flow signal. When the are compared, although the DC removing filter cannot remove the movement of the wall so well as the trend removing filter, it attenuates scarcely the blood flow signal. By the 1st-order MTI filter the movement of the wall remains more than by the line filter and it can be said that it is a filter, by which the blood flow signal is also attenuated. From the above description, under the assumption described above, it can be said that the trend removing filter is the most suitable.

Figure 11A:
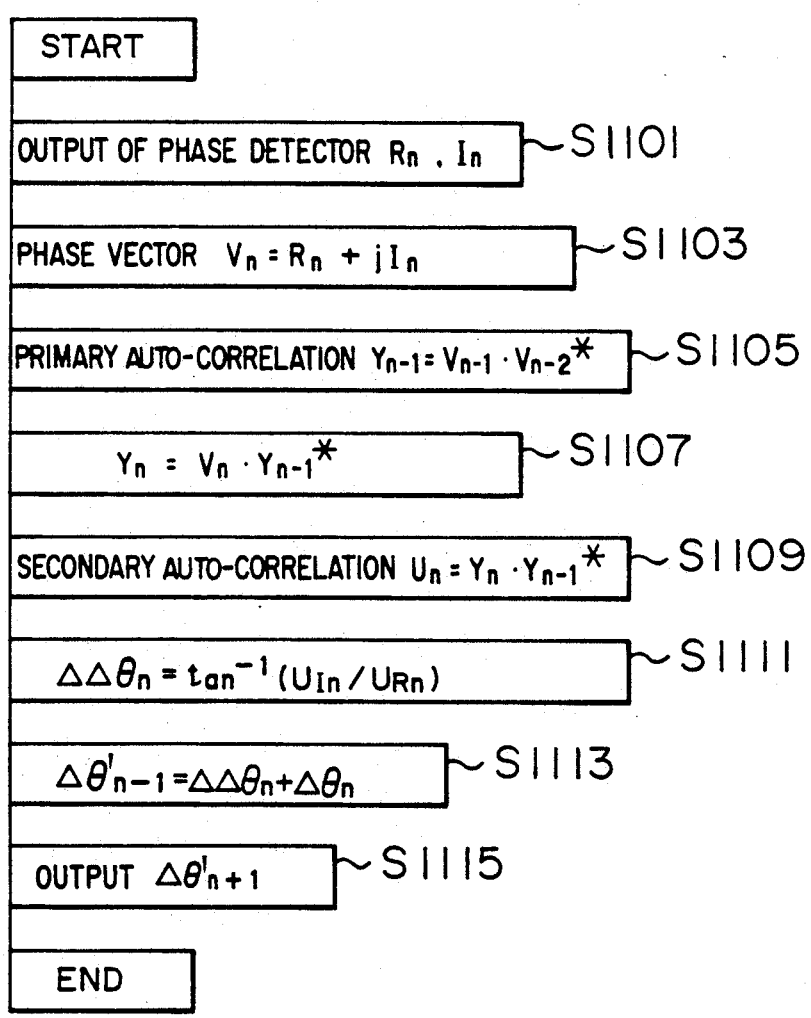
FIGS. 11A and 11B are PAD schemes indicating the acceleration method.

Therefore, in the present embodiment, the processing is effected by means of the trend removing filter as indicated in FIG. 11A, the values of the real part and the imaginary part are outputted for every packet (Step 1101). In this way, N filtered phase vectors are obtained for every packet (Step 1103). Then the autocorrelation of the phases of these N phase vectors is formed. A plurality of vectors thus obtained are arithmetically averaged to obtain a phase difference vector $Y_{n-1}$ indicating the phase difference of the received signal in pulse repetition period T (Step 1105). Consequently a phase difference vector $Y_n$ is obtained for every packet. Further, when the phase difference vector $Y_n$ at the succeeding point of time is obtained (Step 1107), a difference vector $U_n$ of phase differences is obtained by the auto-correlation processing $Y_n \cdot Y_{n-1}^*$ (Step 1109). In this way, the angle $\Delta\Delta\theta_n$ thereof is obtained (Step 1111) and $\Delta\Delta\theta_n$ is added to the current phase difference $\Delta\theta_n$ (Step 1113) to obtain the phase difference $\Delta\theta'_{n+1}$ at the succeeding point of time. This phase difference $\Delta\theta'_{n+1}$ is outputted in Step 1115. Or various sorts of processings are effected on the basis of the value of this $\Delta\theta'_{n+1}$.

Figure 11B:
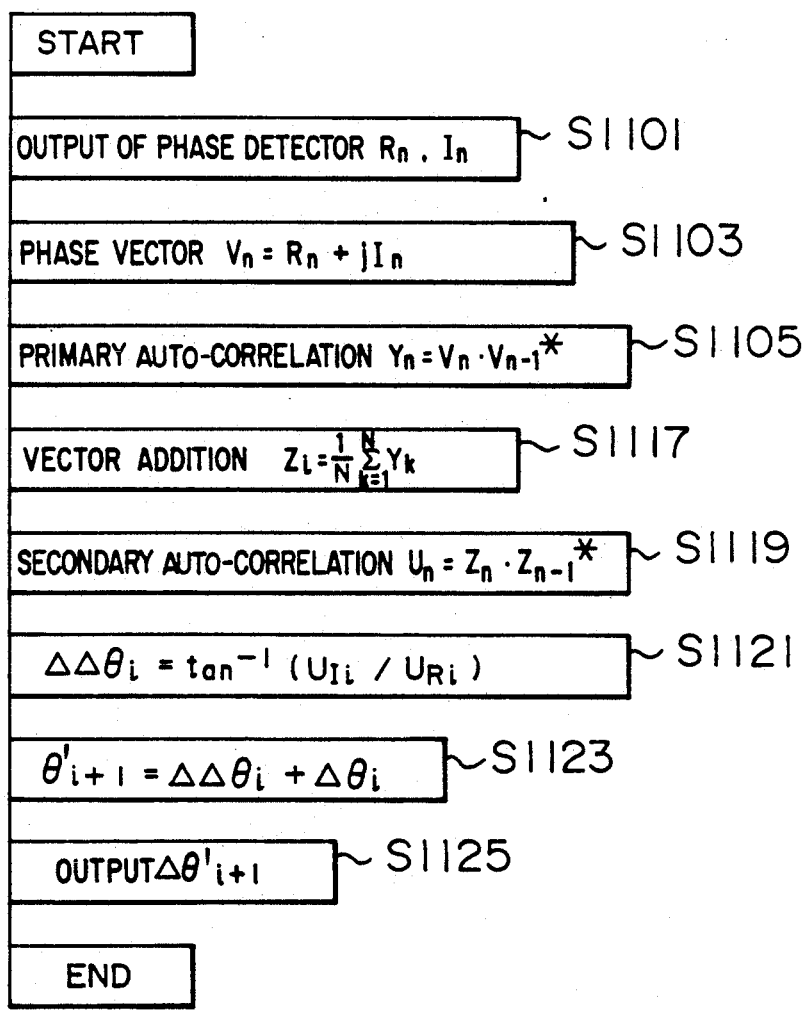

Further, when it is anticipated that noise is abundantly included, as indicated in FIG. 11B, phase difference vectors $Y_n$ obtained in Step 1105 is again arithmetically moving-averaged (Step 1117). For the average vector $Z_i$ of the obtained phase differences a secondary correlation is formed (Step 1119), the difference $\Delta\Delta\theta_i$ of the phase differences is obtained (Step 1121), and the value of $\Delta\theta'_{i+1}$ is outputted. Noise is absorbed by effecting such a processing so that the value of the obtained phase difference $\Delta\theta'_{n+1}$ is smoothened.

When a true difference value corresponding to the true value of acceleration of blood flow is exceed from $\pm\pi$, the value $\Delta\Delta\theta_n$ obtained through the method shown in FIG. 11B includes aliasing because the difference $\Delta\Delta\theta_n$ obtained as a principal value of angle. Namely, a secondary aliasing is produced in the phase difference $\Delta\theta'$ and the obtained value of $\Delta\theta'$ is deviated by $\pm 2\pi$, which gives rise to an error. This secondary aliasing is produced by the fact that the attenuation by the filter is significantly lowered in the neighborhood of the zero point and that it is difficult to secure a satisfactory S/N ratio.

It is a matter of course that, by means of the filter according to the present invention, since it is so constructed that the whole data inputted therein are used to approximate the low frequency component and this is subtracted from each of the input values to make the high frequency component pass through, it is possible to obtain an S/N ratio higher than that obtained by means of a usual filter. In this way the probability of the production of the secondary aliasing described above is decreased.

Even if such a filter is used, it is difficult to secure a sufficient S/N ratio in the neighborhood of the zero point. Therefore, hereinbelow an embodiment, by which, in the case where the secondary aliasing is produced, it is detected and $\Delta\theta$ which is closer to the true value, is obtained, will be explained.

Figure 12:
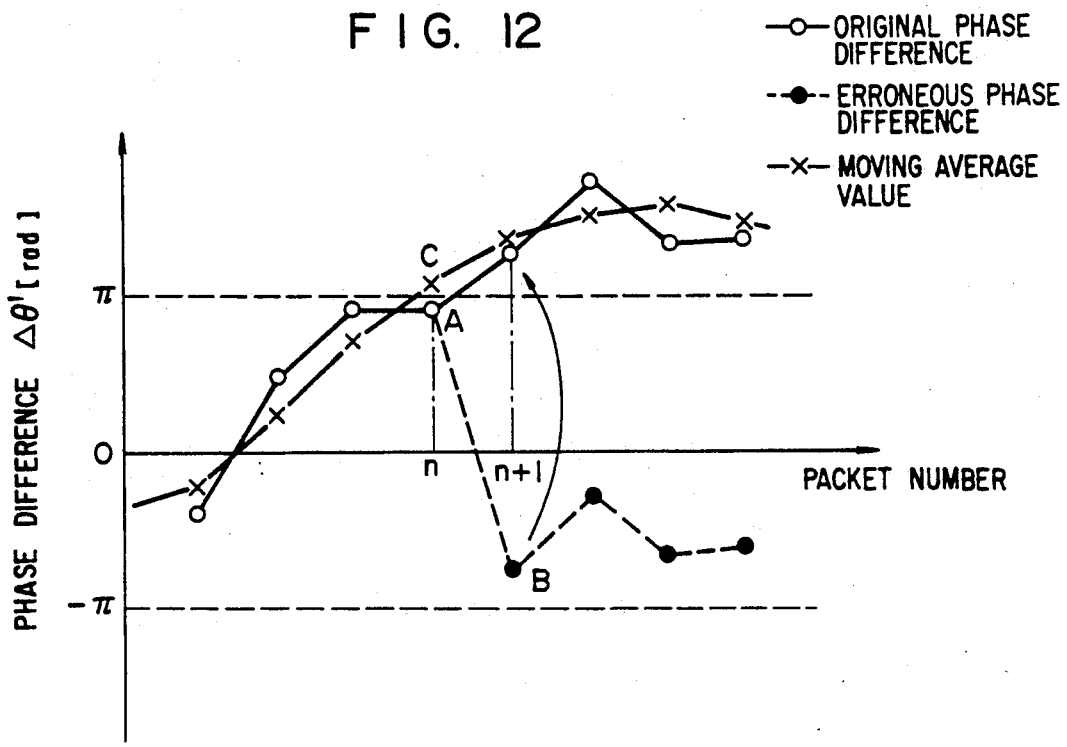
FIG. 12 shows the principle of a first embodiment for correcting a secondary aliasing.
Figure 13:
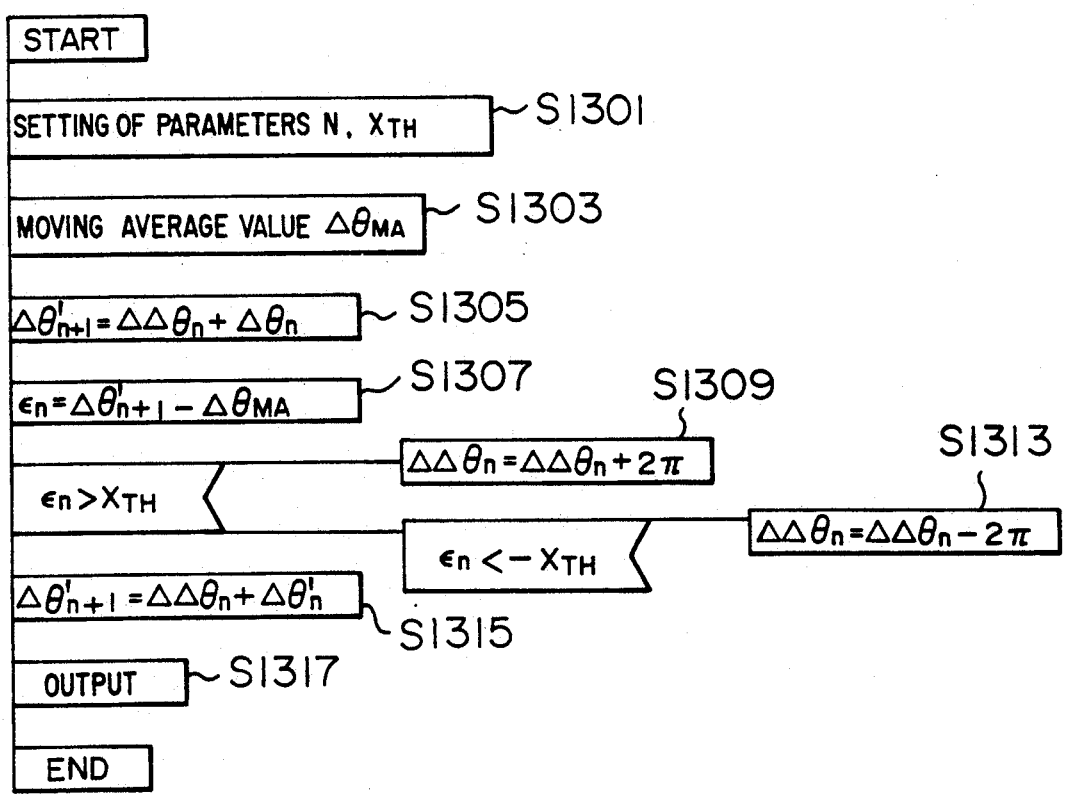
FIG. 13 is a PAD scheme of the same.

FIG. 12 is a scheme for explaining the principle of the present embodiment and FIG. 13 is a PAD scheme indicating the procedure of the processing.

In FIG. 12, the ordinate indicate the phase difference and the abscissa the packet number. Variations in the original phase difference are indicated by $\bigcirc$, which are variations due to influences of the noise. Therefore, in Step 1303, the moving average of the phase difference is formed always for a plurality of packets. That is, the average of N (e.g. 10, set previously in Step 1301) phase differences, counting back from the current phase difference $\Delta\theta_n$, is calculated always. This moving average $\Delta\theta_{MA}$ is indicated by X, for which noise is suppressed and which varies smoothly. Therefore, this moving average $\Delta\theta_{MA}$ is used as a reference value for the detection of the second aliasing. Marks ● indicate variations in the phase difference having an error of $-2\pi$ due to the production of the aliasing.

Here the phase difference $\Delta\theta'_n$ of the n-th packet in which aliasings have been already removed is denoted by A, the phase difference of the (n+1)th packet by B, and the moving average of the n-th packet by C. Where the phase difference $\Delta\theta'_{n+1}$ of the (n+1)th packet is obtained by adding a principal value $\Delta\Delta\theta_n$ of the difference $(\Delta\theta_{n+1} - \Delta\theta'_n)$ obtained by the Step 1121 in FIG. 11B to the phase difference $\Delta\theta'_n$ of the n-th packet (Step 1305). At this time, the difference between the point B, which is the (n+1)th phase difference, and the point C, which is the reference value, is denoted by $\epsilon_n$ (Step 1307). The judgment on the production of the second aliasing is effected, depending on whether thus difference $\epsilon_n$ is greater than a certain threshold value $X_{TH}$ previously determined in Step 1301 or not. That is, after the angle $\Delta\Delta\theta_n$ of the difference vector U of two phase differences is obtained by Step 1121 in FIG. 11B, the difference $\epsilon_n$ between the phase difference $\Delta\theta'_{n+1}$ at the succeeding point of time and the moving average $\Delta\theta_{MA}$ of the phase difference upto the current point of time is calculated (Step 1307). As a result of adding $\pm 2\pi$ to the $\Delta\Delta\theta_n$, $\pm 2\pi$ is added to the phase difference $\Delta\theta_{n+1}$ to correct it. $\epsilon_n > X_{TH}$, it is judged that the second aliasing has been produced and $2\pi$ is added to the original angle $\Delta\Delta\theta$ calculated from the phase difference vector U of the difference (Step 1309). The new angle $\Delta\Delta\theta_n$ obtained by adding $2\pi$ is added to the phase difference $\Delta\theta'_n$, which has been correctly obtained upto the current point of time, to form the phase difference $\Delta\theta_{n+1}$ at the succeeding point of time. In this way the procedure returns to the original variation curve of the phase difference (Step 1315). In the case where $\epsilon_n < -X_{TH}$, the acceleration (difference $\Delta\Delta\theta_n$ of phase differences) is corrected by subtracting $2\pi$ (Step 1313). In Step 1317, $\Delta\theta'_{n+1}$ obtained by this correction (when $\epsilon_n < X_{TH}$, the value in Step 1305) is outputted. In this way $\Delta\theta'_{n+1}$ can be measured without aliasing.

Figure 14:
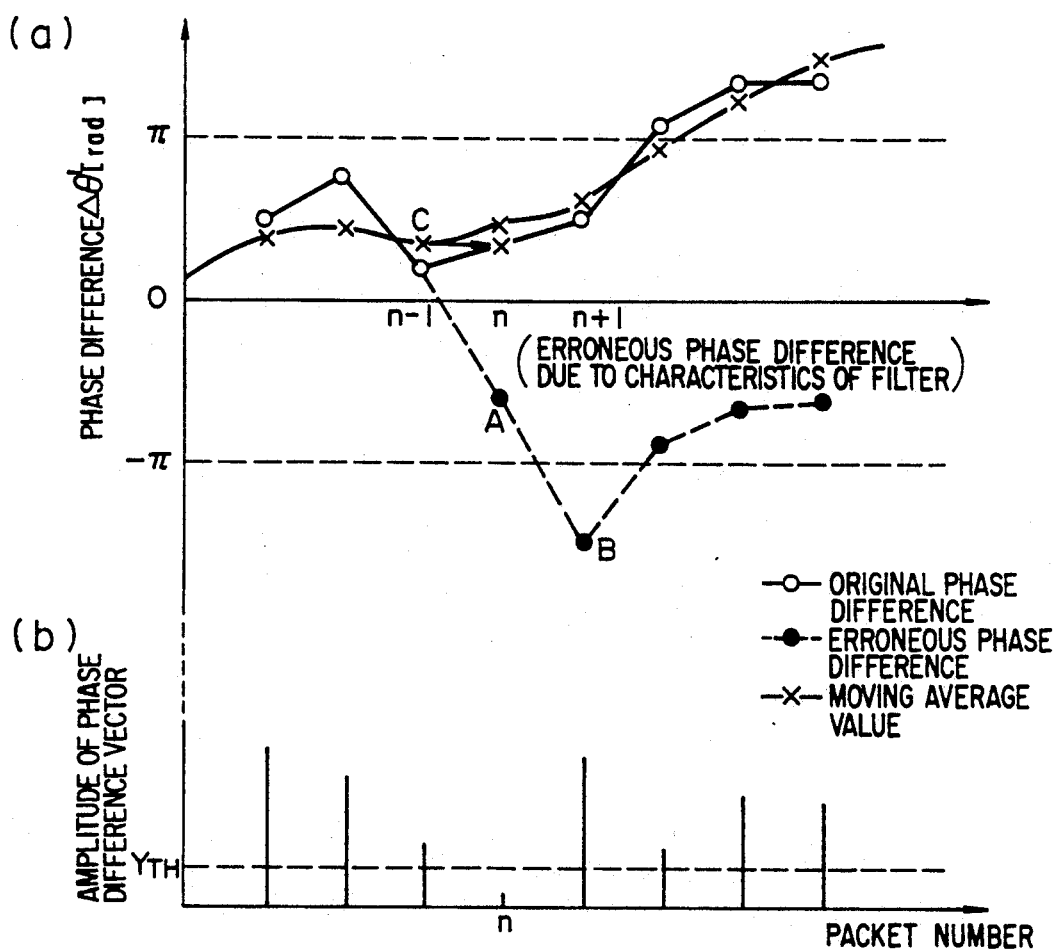
FIG. 14 shows the principle of a second embodiment for correcting a secondary aliasing.
Figure 15:
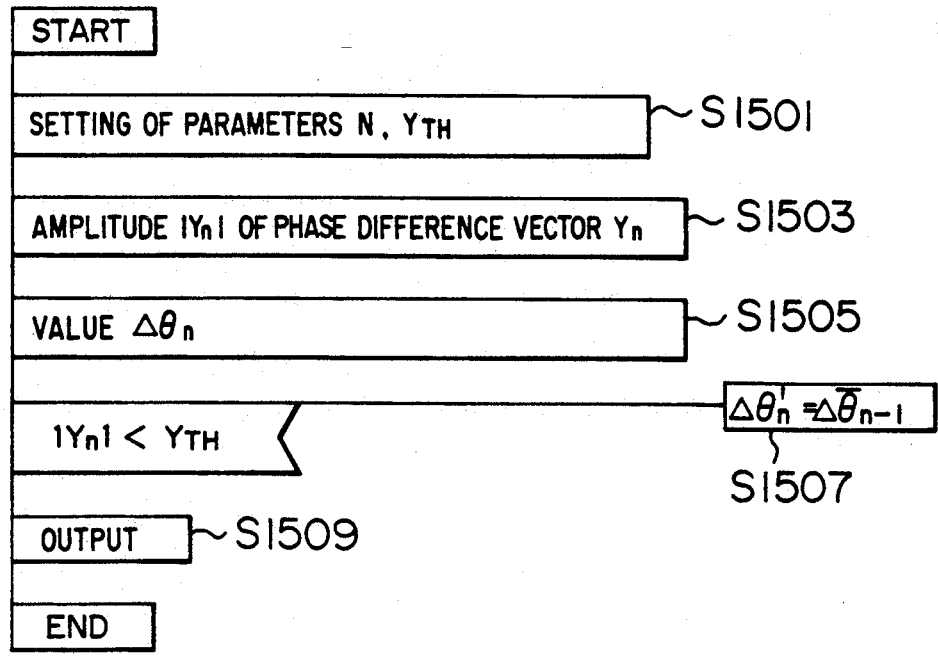
FIG. 15 is a PAD scheme of the same.

FIG. 14 is a scheme for explaining the principle of another embodiment and FIG. 15 is a PAD scheme indicating the procedure of the processing.

In the present embodiment, in view of the fact that the secondary aliasing is produced in the neighborhood of the zero points of the filter, where the amplitude of the block flow signal is remarkably attenuated, the correction of the secondary aliasing is effected, starting from the magnitude of the amplitude of the signal.

In (a), the ordinate represents the phase difference and the abscissa the packet number, as in FIG. 12. Variations in the original phase difference for every packet are indicated by $\bigcirc$ and the moving average of the N phase differences by X. Further FIG. 14(b) shows the amplitude $|Y_n|$ of the average phase difference vector $Y_n$ for each of the packets. Now, the amplitude $|Y_{n+1}|$ of the (n+1)th packet is extremely small because of influences of the zero point and the phase difference is outputted erroneously at the point A. In this way the second aliasing is produced between the (n+1)th phase difference and the n-th phase difference.

In order to correct this aliasing, in the present embodiment, the algorithm indicated in the PAD scheme in FIG. 15 is executed. That is, in Step 1501, a certain threshold value $Y_{TH}$ is set for the number of data sets N and the absolute value of the amplitude of the phase difference vector taken-in when the moving average is calculated. In Step 1503, the average of the absolute value of the amplitude of the phase difference vector is calculated for every packet. In Step 1505, the moving average $\overline{\Delta\theta}$ the phase difference $\Delta\theta'$ is calculated. Then, when the absolute value of the amplitude of the phase difference vector in the n-th packet is smaller than the threshold value $Y_{TH}$, the value of the phase difference $\Delta\theta'_n$ is substituted by $\Delta\theta_{n-1}$ in Step 1507. In Step 1509, the phase difference $\Delta\theta'_n$. (when it is replaced by the moving average $\overline{\Delta\theta}_{n-1}$ preceding by 1 packet, that value) is outputted.

Further, in the case of the embodiment described above, $\Delta\theta'_n$ may be replaced by $\Delta\theta'_{n-1}$.

Further, dispersion of the phase difference $\Delta\theta'_{n'}$ $$\text{i.e. } \frac{1}{N} \Sigma (\Delta\theta'_n - \Delta\theta_n)^2,$$

is formed and when the value thereof exceeds a predetermined threshold value $\Sigma_{TH}$, $\Delta\theta'_n$ may be replaced by $\Delta\theta_{n-1}$ or $\Delta\theta'_{\overline{n}-1}$.

In the above description, the value used for the replacement is not restricted to $\Delta\theta_{n-1}$ or $\Delta\theta'_{n-1}$ of the (n-1)th packet, but $\Delta\overline{\theta}_{n+k}$ or $\Delta\theta'_{n+k}$ of the packets preceding or succeeding by k (e.g. k=1-8) may be used therefor.

Furthermore, instead of calculating the moving average, the data may be made pass through a low pass filter to smoothen variations of "$\bigcirc$" in FIGS. 12 and 14, which may be used as the reference value.

In any case, since the real blood flow velocity varies slowly, it is preferable to approximate variations in the phase difference $\Delta\theta'_n$ by using some regression lines, as described above.

Further, it may happen that errors are included in the correction for the secondary aliasing operated in the above embodiments so that it is desirable to check the errors and to calibrate them periodically. The pulse Doppler method using two kinds of pulse intervals described in U.S. Pat. No. 4,751,847 is adapted to check the errors. In more detail, a series of N pulses in which one pulse interval T and another pulse interval T+Ts are generated alternately is used as a packet $n_0$ instead of the series of N pulse of same pulse interval T described in the above embodiments. Among the N pulses, N/2 pulses each after interval T are used for obtaining a phase difference vector $Z_n$ and for obtaining a difference vector $U_n$ between two phase difference vectors $Z_n$ and $Z_{n-1}$ to derive the value $\Delta\Delta\theta_n$ just as shown in FIG. 11B. The angle $\Delta\Delta\theta_n$ obtained from the vector $U_n$ and with its secondary aliasing corrected as described in the above embodiments adds to the present phase different angle $\theta'_n$ to reproduce a value of the following phase difference angle $\Delta\theta'_{n+1}$. Another value of the following phase difference is also derived from signals in packet $n_0$ by using the method described in U.S. Pat. No. 4,751,847. Namely, a continuous pulse pair of a pulse after interval T and a pulse after interval (T+Ts) is used for obtaining difference vector U". The argument $\Delta\theta''$ of the vector U" is then calculated. The value $\Delta\theta''$ represents phase difference generated within the time Ts. Therefor, the value $\Delta\theta'' \times T/Ts$ is derived as another value of the following phase differences. The value $\Delta\theta_{n+1}'$ should be almost same as the value $\Delta\theta'' \times T/Ts$, if the correction of the second aliasing have been correctly performed. So, the value $\Delta\theta_{n+1}'$ is compared with the value $\Delta\theta'' \times T/Ts$. In case where the difference between the two values exceed the range of $\pm\pi$, it indicates that the correction for the secondary aliasing includes the errors. Then $2n\pi$ ($n = \pm 1, \pm 2, \ldots$) is added to the $\Delta\theta_{n+1}$ is calibrate the errors. The difference between $\Delta\theta'_{n+1}$ and $(\Delta\theta'' \times T/Ts)$ thus obtained becomes within the range $\pm\pi$. And a velocity of the object to be measured is calculated by using the calibrated $\Delta\theta_{n+1}$.

It is preferable to practice the above checking method at least once a cardiac cycle of the object.

Furthermore it is possible also to effect frequency analysis by using precise phase differences obtained by the various embodiments described above (Refer to U.S. Pat. No. 3,953,823).

The reason why the aliasing is produced in the frequency analysis consists in the periodicity, which the inverse trigonometrical function representing the phase signal has.

Figure 16:
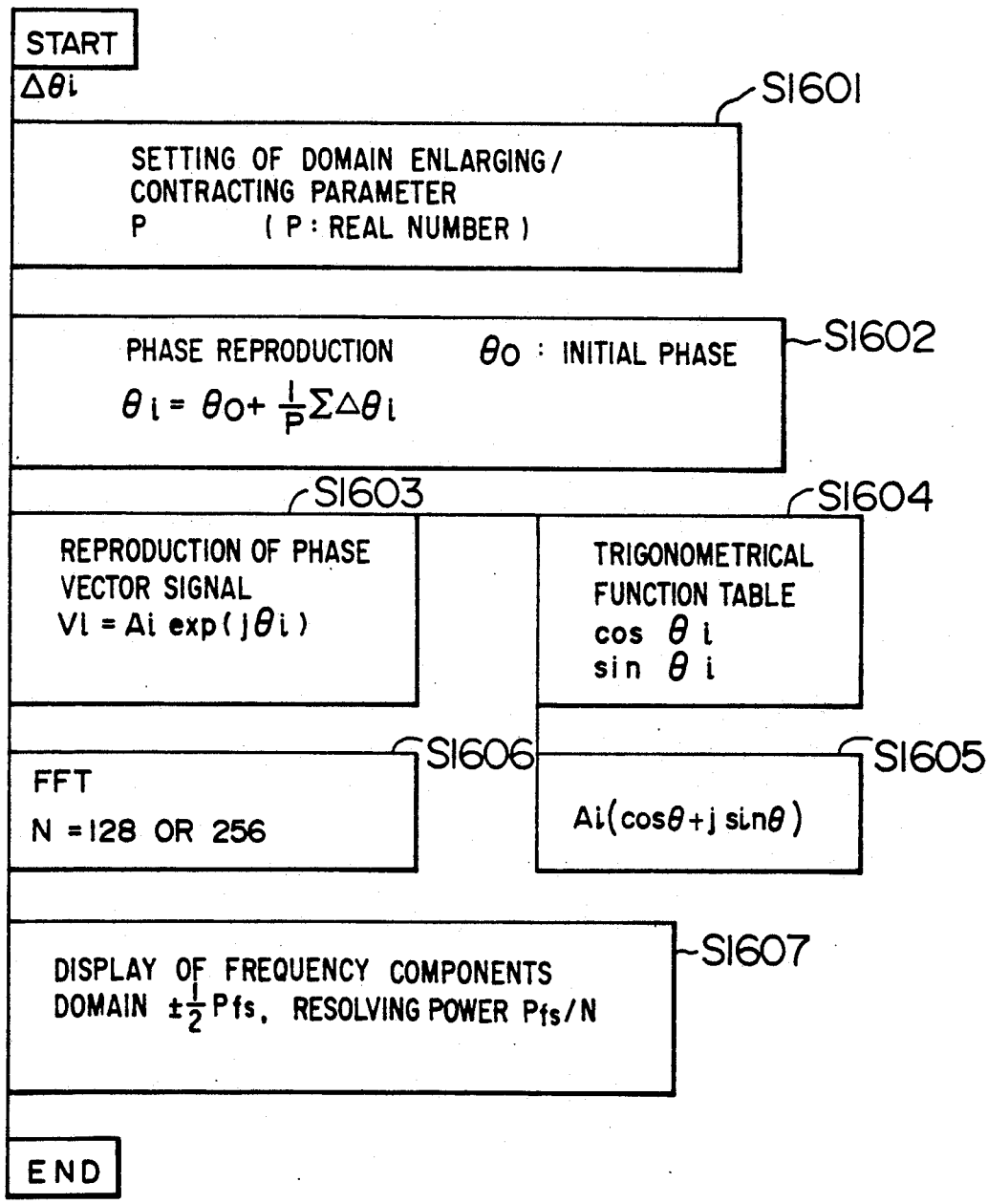
FIG. 16 is a PAD scheme of still another embodiment.

As indicated in FIG. 16, in Step 1602, the phase $\theta_i$ is reproduced by adding phase differences $\Delta\theta_i$ one after another, multiplying the sum thus obtained by a predetermined parameter 1/p, and adding the initial phase $\theta_0$ thereto. In Step 1604, the reproduced phase $\theta_i$ is transformed into a sinus component and a cosinus component, using a trigonometrical function table. In Step 1605, an amplitude held previously is multiplied thereto to obtain the phase signal $V_i$ (complex number) which represents a reproduced phase vector (Step 1603). This phase signal $V_i$ includes a domain enlarging/contracting parameter p (arbitrary real number) and it is a signal, from which the aliasing is removed.

The domain enlarging/contracting parameter p (arbitrary real number) is set in Step 1601 and can enlarge/contract the domain of the frequency analysis by p times. In this way a blood flow of higher velocity can be measured without errors in the direction. Instead thereof, the precision is lowered. For example, when $f_s = 4$ kHz, p = 5.0, the measurable domain is $f_s \pm 10$ kHz (usually when p = 1) $f_s \pm 2$ kHz. On the contrary, when the parameter p is smaller than 1, the measurable domain is contracted by $\pm 0.5$ p. However, at the contraction, the precision is improved. For example, $f_s = 4$ kHz, p = 0.2, the measurable domain is $\pm 0.1$ kHz and the precision is increased by 5 times. In this way, a blood flow of lower velocity can be measured.

Usually a phase signal $V_i$ consisting of N = 128 or 258 data sets is subjected to a frequency analysis by FFT (fast Fourier transformation), by which a one-dimensional Doppler frequency distribution exceeding the limit of the prior art technique can be obtained. In the display of frequency components in Step 1607, the display domain is $\pm 0.5$ p $\times f_s$ and the frequency resolving power is p $\times f_s$/N.

In the realization of the acceleration method in CFM (color flow mapping) there is a problem of FR (frame rate). At a high FR exceeding e.g. 20 frames/sec, the difference of phase differences can be detected with a high precision between different frames. Therefore the method contrived in one-dimension can be applied thereto. Denoting the difference of phase differences between the current frame and the directly preceding frame by $\Delta\Delta\theta(k, l, m)$, the phase difference $\Delta\theta(i, l)$ of the current frame is given by:

$$\Delta\theta(i, l) = \Delta\theta(0, l) + \sum_{m=1}^{i} \Delta\Delta\theta(k, l, m)$$

where i is the frame number; l is the packet number and m is the data number.

For the initial phase difference $\Delta\theta(o, l)$ a value having no errors is given previously. This is made possible by the method by wave transmission with not constant intervals described previously. The initial phase difference is periodically updated.

At a low FR, where the period T is too great, in the case where the acceleration is great, it is difficult to detect precisely the difference of phase differences between different frames. In order to increase the SN ratio, for reasons that the number of additions of phase differences within a pixel (extremely small area to be measured, a number of these areas disposed continuously forming one frame) is increased, etc., in some cases the FR is lowered. As a measure under a low FR, the difference of phase differences may be detected between different pixels within a same frame. The difference of phase differences in this case corresponds to the vector acceleration. Denoting the difference of phase differences between different pixels by $\Delta\Delta\theta(i, m)$, an arbitrary phase difference $\Delta\theta(i, l)$ within the current frame is given by:

$$\Delta\theta(i, l) = \Delta\theta(i, o) + \sum_{m=1}^{l} \Delta\Delta\theta(i, m)$$

where i is the frame number and l is the pixel number. Concerning the above description, refer to U.S. Pat. No. 4,573,477.

We claim:

1. A pulse Doppler measuring apparatus comprising:
   transmitting/receiving means, which transmits burst-like ultrasonic waves to an object with a constant interval in time one after another and receives waves reflected by said object to generate received signals;

means for forming a first phase vector of at least one of said reflected waves by mixing a reflection signal obtained from said reflected wave with a reference signal;

an MTI filter, which decomposes said first Phase vector into a real part and an imaginary part, obtains a first regression line, and extracts a second phase vector corresponding only to the high frequency component of said reflected wave, using differences of the real part and the imaginary part from said first regression line;

means for obtaining a current first phase difference vector representing a phase difference between the phase of a current one of said second phase vector and the phase of a preceding one of said second Phase vector;

means for forming a difference vector indicating a difference between current phase differences, using the current one of said first phase difference vector and a preceding one of said first phase difference vector; and means for obtaining a current second phase difference vector, using the preceding one of said first phase difference vector and said difference vector indicating a difference between current phase differences, and further calculating the velocity of said object, using said second phase difference vector.

2. A pulse Doppler measuring apparatus according to claim 1, wherein said first regression line, which said MTI filter uses, is obtained by approximating variations of the real part and the imaginary part of first phase vectors obtained one after another by the least square method for every packet consisting of a predetermined number of said first phase vectors.

3. A pulse Doppler measuring apparatus according to claim 1, wherein said first regression line, which said MTI filter uses, is obtained by approximating variations of the real part and the imaginary part of first phase vectors obtained one after another by the moving average for every packet consisting of a predetermined number of said first phase vectors.

4. A pulse Doppler measuring apparatus comprising:
transmitting/receiving means, which transmits burst-like ultrasonic waves to an object with a constant interval in time one after another and receives waves reflected by said object to generate received signals;

means for forming a phase vector of at least one of said reflected waves by mixing a reflection signal obtained from said reflected wave with a reference signal;

means for obtaining a current phase difference vector representing a phase difference between the phase of a current one of said phase vector and the phase of a preceding one of said phase vector;

means for obtaining a current value of a first phase difference $\Delta\theta$ by calculating an argument of said current phase difference;

means for obtaining a current value of a second phase difference $\Delta\theta'$ in which aliasings are corrected, said second phase difference obtaining means including, (a) means for obtaining a principal value $\Delta\Delta\theta_n$ of a difference between said current value $\Delta\theta_{n+1}$ of said first phase difference and a preceeding value $\Delta\theta'_n$ of said second phase difference, (b) means for obtaining a provisional value $\Delta\theta'_{n-1}$ of said second phase difference by adding said principal value $\Delta\Delta\theta_n$ to said preceeding value $\Delta\theta'_n$ of said second phase difference.

(c) means for obtaining a moving avarage of plural values of said second phase difference $\Delta\theta'$ and said preceeding value $\Delta\theta'_n$ of said second phase difference, and (d) correcting means for correcting said provisional value $\Delta\theta'_{n+1}$ into a correct value of said second phase difference by adding $\pm 2\pi$ to said provisional value so that a difference between said moving avarage and said provisional value becomes within a predetermined range; and means for calculating a velocity of said object from said corrected value of said second phase difference.

5. A pulse Doppler measuring apparatus according to claim 4, wherein said second regression line represents the moving average of said first phase difference angle $\Delta\theta$.

6. A pulse Doppler measuring apparatus according to claim 4, wherein said second regression line is obtained by processing said first phase difference angle $\Delta\theta$ by means of a low pass filter.

7. A pulse Doppler measuring apparatus according to claim 4, further comprising:

a second transmitting/receiving means, which transmits second burst-like ultrasonic waves having different intervals from the interval of the first ultrasonic waves to said object periodically and receives waves reflected by said object to generate received signals;

means for producing a third phase different vector on the basis of said second waves; and means for comparing said third phase different vector with said phase different vector produced on the basis of said first waves and correcting an error if the error is included in the correction for the second aliasing operated on the basis of said first waves.

8. A pulse Doppler measuring apparatus according to claim 4, wherein said correcting means is provided with means for detecting the production of said secondary aliasing and means for correcting said phase difference angle.

9. A pulse Doppler measuring apparatus according to claim 8, wherein said secondary aliasing detecting means compares the value of said second regression line with said first phase difference angle $\Delta\theta$ to detect the production of said secondary aliasing on the basis of whether the difference therebetween exceeds a predetermined threshold value or not.

10. A pulse Doppler measuring apparatus according to claim 9, wherein said phase difference angle correcting means substitutes said current first phase difference angle by another first phase different angle, when said secondary aliasing detecting means detects the production of the secondary aliasing.

11. A pulse Doppler measuring apparatus according to claim 10, wherein said another first phase difference angle is preceding one of said first phase difference angle.

12. A pulse Doppler measuring apparatus according to claim 9, wherein said phase difference angle correcting means substitutes said current first phase difference angle $\Delta\theta$ by the value of said second regression line, when said secondary aliasing detecting means detects the production of the secondary aliasing.

13. A pulse Doppler measuring apparatus according to claim 8, wherein said phase difference angle correcting means substitutes said current first phase different angle $\Delta\theta$ by the value of said second regression line, when said secondary aliasing detecting means detects the production of the secondary aliasing.

14. A pulse Doppler measuring apparatus according to claim 13, wherein said second regression line is obtained by moving-averaging said first phase difference angle and the value of said second regression line, which is used for the substitution, is the preceding moving average value.

15. A pulse Doppler measuring apparatus according to claim 13, wherein said secondary aliasing detecting means detects the production of said secondary aliasing on the basis of whether the amplitude of said first phase difference vector exceeds a predetermined threshold value or not.

16. A pulse Doppler measuring apparatus according to claim 13, wherein said secondary aliasing detecting means detects the production of said secondary aliasing on the basis of whether the dispersion of said first phase difference vector exceeds a predetermined threshold value or not.

17. A pulse Doppler measuring apparatus comprising:
transmitting/receiving means, which transmits burst-like ultrasonic waves to an object with a constant interval in time one after another and receives waves reflected by said object to generate received signals;
means for forming a phase vector of at least one of said reflected waves by mixing a reflection signal obtained from said reflected wave with a reference signal;
means for obtaining a current first phase difference vector representing a phase difference between the phase of a current one of said second phase vector and the phase of a preceding one of said second phase vector;
means for obtaining an angular component $\Delta\theta$ of said first phase difference vector;
means for obtaining dispersion of said first phase difference angle $\Delta\theta$;
means for detecting the production of secondary aliasing on the basis of whether the dispersion of said first phase difference angle exceeds a predetermined threshold value or not;
means for effecting a correction by substituting a current first phase difference angle $\Delta\theta_{n+1}$ by another first phase difference angle, when said secondary aliasing detecting means detects the production of the secondary aliasing;
means for obtaining an angle of current difference between phase differences $\Delta\Delta\theta_n$, using said current one of said first phase difference angle $\Delta\theta_{n+1}$ and preceding one of said first phase difference angle $\Delta\theta_n$; and
means for obtaining a current second phase difference angle $\Delta\theta'_{n+1}$, by adding said angle of current difference between phase differences $\Delta\Delta\theta_n$ to said preceding one of said first phase difference angle $\Delta\theta_n$ and further calculating the velocity of said object on the basis of said second phase difference angle $\Delta\theta'_{n+1}$.

18. A pulse Doppler measuring apparatus according to claim 17, wherein said another first phase difference angle is the preceding first phase difference angle $\Delta\theta_n$.

19. A pulse Doppler measuring apparatus according to claim 17, further comprising:
a second transmitting/receiving means, which transmits second burst-like ultrasonic waves having different interval from the interval of the first ultrasonic waves to said object periodically and receives waves reflected by said object to generate received signals;
means for producing a third phase different vector on the basis of said second waves; and
means for comparing said third phase different vector with said phase different vector produced on the basis of said first waves and correcting an error if the error is included in the correction for the second aliasing operated on the basis of said first waves.

20. A pulse Doppler measuring apparatus according to claim 17, further comprising
a second transmitting/receiving means, which transmits second burst-like ultrasonic waves having different interval from the interval of the first ultrasonic waves to said object periodically and receives waves reflected by said object to generate received signals;
means for producing a third phase different vector on the basis of said second waves; and
means for comparing said third phase different vector with said phase different vector produced on the basis of said first waves and correcting an error if the error is included in the correction for the second aliasing operated on the basis of said first waves.

21. A pulse Doppler measuring apparatus comprising:
transmitting/receiving means, which transmits burst-like ultrasonic waves to an object with a constant interval in time one after another and receives waves reflected by said object to generate received signals;
means for forming a phase vector of at least one of said reflected waves by mixing a reflection signal obtained from said reflected wave with a reference signal;
means for obtaining a current first phase difference vector representing a phase difference between the phase of a current one of said second phase vector and the phase of a preceding one of said second phase vector;
means for obtaining an angular component $\Delta\theta$ of said first phase difference vector;
means for obtaining an amplitude component of said first phase difference vector;
means for detecting the production of secondary aliasing on the basis of whether said amplitude exceeds a predetermined threshold value;
means for effecting the correction by substituting said current first phase difference angle $\Delta\theta_{n+1}$ by another first phase difference angle, when said secondary aliasing detecting means detects the production of the secondary aliasing;
means for obtaining an angle of current difference between phase differences $\Delta\Delta\theta_n$, using said current one of said first phase difference angle $\Delta\theta_{n+1}$ and preceding one of said first phase difference angle $\Delta\theta_n$; and means for obtaining a current second phase difference angle $\Delta\theta'_{n+1}$, by adding said angle of current difference between phase differences $\Delta\Delta\theta_n$ to said preceding one of said first phase difference angle $\Delta\theta_n$ and further calculating the velocity of said object on the basis of said second phase difference angle $\Delta\theta'_{n+1}$.

22. A pulse Doppler measuring apparatus comprising:

transmitting/receiving means which transmits burst-like ultrasonic waves to an object with a constant interval in time one after another and receives waves reflected by said object to generate received signals;

means for forming a first phase vector of a reflected wave by mixing a reflection signal obtained from said reflected wave with a reference signal;

an MTI filter, which decomposes said first phase vector into a real part and an imaginary part, obtains a first regression line, and extracts a second phase vector corresponding only to the high frequency component of said reflected wave, using differences of the real part and the imaginary part from said first regression line;

means for obtaining a current first phase difference vector representing a phase difference between the phase of a current one of said second phase vector and the phase of a preceding one of said second phase vector;

means for obtaining an angular component $\Delta\theta$ of said first phase difference vector;

means for obtaining a second regression line for said first phase difference angle $\Delta\theta$;

correcting means for correcting said first phase difference angle $\Delta\theta$, using said second regression line, to prevent the production of a secondary aliasing;

means for obtaining an angle of current difference between phase differences $\Delta\Delta\theta_n$, using current one of said first phase difference angle $\Delta\theta_{n+1}$ and preceding one of said first phase difference angle $\Delta\theta_n$; and means for obtaining a current second phase difference angle $\Delta\theta'_{n+1}$, by adding said angle of current difference between phase differences $\Delta\Delta\theta_n$ to said preceding one of said first phase difference angle $\Delta\theta_n$ and further calculating the velocity of said object on the basis of said phase difference angle $\Delta\theta$.

23. A pulse Doppler measuring apparatus according to claim 22, wherein said correcting means is provided with means for detecting the production of said secondary aliasing and means for correcting said phase difference angle.

24. A pulse Doppler measuring apparatus according to claim 23, wherein said secondary aliasing detecting means compares the value of said second regression line with said first phase difference angle $\Delta\theta$ to detect the production of said secondary aliasing on the basis of whether the difference therebetween exceeds a predetermined threshold value or not; and said phase difference angle correcting means substitutes said current first phase difference angle $\Delta\theta$ by the value of said second regression line, when said secondary aliasing detecting means detects the production of the secondary aliasing.

25. A pulse Doppler measuring apparatus according to claim 23 wherein said secondary aliasing detecting means detects the production of said secondary aliasing on the basis of whether the amplitude of said first phase difference vector exceeds a predetermined threshold value or not; and said phase difference angle correcting means substitutes said current first phase difference angle $\Delta\theta$ by the value of said second regression line, when said secondary aliasing detecting means detects the production of the secondary aliasing.

26. A pulse Doppler measuring apparatus according to claim 22, wherein said means for calculating the velocity utilizes frequency analysis.

27. A pulse Doppler measuring apparatus according to claim 26 wherein said means for calculating the velocity adds said phase difference angles $\Delta\theta'_{n+1}$ multiplies the sum thus obtained by an arbitrary domain enlarging/contracting parameter, adds an initial phase thereto, multiplies the sum thus obtained by the predetermined amplitude to reproduce the signal representing a second phase vector, and subjects the signal to a frequency analysis.

28. A pulse Doppler measuring method comprising:

a transmitting/receiving step, in which burst-like ultrasonic waves are transmitted to an object with a constant interval in time one after another and waves reflected by said object are received to generate received signals;

a step of forming a first phase vector of at least one of said reflected waves by mixing a reflection signal obtained from said reflected wave with a reference signal;

a step of decomposing said first phase vector into a real part and an imaginary part, obtaining a first regression line, and extracting a second phase vector corresponding only to the high frequency component of said reflected wave, starting from differences of the real part and the imaginary part from said first regression line;

a step of obtaining a current first phase difference vector representing a phase difference between the phase of a current one of said second phase vector and the phase of a preceding one of said second phase vector;

a step of forming a vector indicating a difference between current phase differences, using current one of said first phase difference vector and preceding one of said first phase difference vector; and a step of obtaining a current second phase difference vector, using preceding one of said first phase difference vector and said vector indicating a difference between current phase differences, and further calculating the velocity of said object, using said second phase difference vector.

29. A pulse Doppler measuring method according to claim 28, further comprising a step of checking for errors in said current second phase difference vector and correcting them periodically.

30. A pulse Doppler measuring method comprising:

a transmitting/receiving step, in which burst-like ultrasonic waves are transmitted to an object with a constant interval in time one after another and waves reflected by said object are received to generate received signals;

a step of forming a phase vector of at least one of said reflected waves by mixing reflection signal obtained from said reflected wave with a reference signal;

a step of obtaining a current first phase difference vector representing a phase difference between the phase of a current one of said second phase vector and the phase of a preceding one of said second phase vector;

a step of obtaining an angular component $\Delta\theta$ of said first phase difference vector;

a step of obtaining a second regression line for said first phase difference angle $\Delta\theta$;

a correcting step of correcting said first phase difference angle $\Delta\theta$, using said second regression line, to prevent the production of a secondary aliasing;

a step of obtaining an angle of current difference between phase differences $\Delta\Delta\theta_n$, using current one of said first phase difference angle $\Delta\theta_{n+1}$ and preceding one of said first phase difference angle $\Delta\theta_n$; and a step of obtaining a current second phase difference angle $\Delta\theta'_{n+1}$, by adding said angle of current difference between phase differences $\Delta\Delta\theta n$ to said preceding one of said first phase difference angle $\Delta\theta_n$ and further calculating the velocity of said object on the basis of said phase difference angle $\Delta\theta$.

31. A pulse Doppler measuring apparatus comprising:

transmitting/receiving means, which transmits burst-like ultrasonic waves to an object with a constant interval in time one after another and receives waves reflected by said object to generate received signals;

means for forming a phase vector of at least one of said reflected waves by mixing a reflection signal obtained from said reflected wave with a reference signal;

means for obtaining a first phase difference vector representing a phase difference between the phase of said phase vector in a first part to be measured and the phase of said phase vector in a second part to be measured;

means for obtaining an angular component $\Delta\theta$ of said first phase difference vector;

means for obtaining a second regression line for said first phase difference angle $\Delta\theta$;

correcting means for correcting said first phase difference angle $\Delta\theta$, using said second regression line, to prevent the production of a secondary aliasing;

means for obtaining an angle of difference between phase differences $\Delta\Delta\theta_I$, using one of said first phase difference angle $\Delta\theta_{I+1}$ and another of said first phase difference angle $\Delta\theta_I$ obtained between other parts to be measured; and means for obtaining a second phase difference angle $\Delta\theta'_{I+1}$ by adding said angle of difference between phase differences $\Delta\theta_I$ to said another of said first phase difference angle $\Delta\theta_I$, further adding phase difference angle $\Delta\theta'_{I+1}$ thereto, multiplying it by an arbitrary domain enlarging/contracting parameter, adding an initial phase thereto to reproduce the signal representing a second phase vector, and subjecting the signal two-dimensionally to a frequency analysis.

32. A pulse Doppler measuring apparatus comprising:

transmitting/receiving means, which transmits burst-like ultrasonic waves to an object with a constant interval in time one after another and receives waves reflected by said object to generate received signals;

means for forming a phase vector of at least one of said reflected waves by mixing a reflection signal obtained from said reflected wave with a reference signal;

means for obtaining a first phase difference vector representing a phase difference between the phase of said phase vector in a first part to be measured and the phase of said phase vector in a second part to be measured;

means for obtaining an angular component $\Delta\theta$ of said first phase difference vector;

means for obtaining dispersion of said first phase difference angle $\Delta\theta$;

means for detecting the production of secondary aliasing on the basis of whether the dispersion of said first phase difference angle exceeds a predetermined threshold value;

means for effecting the correction by substituting one of said phase difference angle $\Delta\theta_{n+1}$ by another of said first phase difference angle obtained between other parts to be measured, when said secondary aliasing detecting means detects the production of the secondary aliasing;

means for obtaining a second phase difference angle $\Delta\theta'_{I+1}$ by adding said angle of difference between phase differences $\Delta\theta_I$ to said another of said first phase difference angle $\Delta\theta_I$, further adding phase difference angle $\Delta\theta'_{I+1}$ thereto, multiplying it by an arbitrary domain enlarging/contracting parameter, adding an initial phase thereto to reproduce the signal representing a second phase vector, and subjecting the signal two-dimensionally to a frequency analysis.

33. A pulse Doppler measuring apparatus comprising:

transmitting/receiving means, which transmits burst-like ultrasonic waves to an object with a constant interval in time one after another and receives waves reflected by said object to generate received signals;

means for forming a phase vector of at least one of said reflected waves by mixing a reflection signal obtained from said reflected wave with a reference signal;

means for obtaining a first phase difference vector representing a phase difference between the phase of said phase vector in a first part to be measured and the phase of said phase vector in a second part to be measured;

means for obtaining an angular component $\Delta\theta$ of said first phase difference vector;

means for obtaining an amplitude component of said first phase difference vector;

means for detecting the production of secondary aliasing on the basis of whether said amplitude exceeds a predetermined threshold value;

means for effecting the correction by substituting one of said first phase difference angle $\Delta\theta_{n+1}$ by another first phase difference angle obtained between other parts to be measured, when said secondary aliasing detecting means detects the production of the secondary aliasing;

means for obtaining a second phase difference angle $\Delta\theta'_{I+1}$, by adding said angle of difference between phase differences $\Delta\theta_I$ to said another of said first phase difference angle $\Delta\theta_I$, further adding phase difference angle $\Delta\theta_{I+1}$ thereto, multiplying it by an arbitrary domain enlarging/contracting parameter, adding an initial phase thereto to reproduce the signal representing a second phase vector, and subjecting the signal two-dimensional to a frequency analysis.

* * * * *